(12) United States Patent
Nakamura et al.

(10) Patent No.: US 6,239,517 B1
(45) Date of Patent: May 29, 2001

(54) LINEAR SHUTTLE MOTOR ASSEMBLY AND A CONTROLLER THEREFOR

(75) Inventors: Takashi Nakamura; Toshio Hiki, both of Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/507,667

(22) Filed: Feb. 22, 2000

(30) Foreign Application Priority Data

Feb. 19, 1999 (JP) .................................................. 11-041309

(51) Int. Cl.[7] .............................. B41J 23/00; H02K 33/18
(52) U.S. Cl. ........................ 310/12; 400/322; 101/93.04; 310/17
(58) Field of Search .................................. 310/12, 13, 14, 310/112, 114, 115, 116, 117, 118, 121, 15, 17, 20, 28; 318/135; 400/322; 101/93.04, 93.05

(56) References Cited

U.S. PATENT DOCUMENTS

| | | | |
|---|---|---|---|
| 5,229,670 | * | 7/1993 | Kagawa ................................. 310/12 |
| 5,281,880 | * | 1/1994 | Sakai ..................................... 310/115 |
| 5,338,121 | * | 8/1994 | Kobayashi et al. ................ 310/12 X |

* cited by examiner

*Primary Examiner*—Nestor Ramirez
*Assistant Examiner*—Judson H. Jones
(74) *Attorney, Agent, or Firm*—McGuireWoods LLP (57) ABSTRACT

A linear shuttle motor assembly used for reciprocally moving a printer head includes a rotor and a stator having the same mass. A loud, i.e., the printer head, is connected to the stator and a counter balance to the rotor. The rotor and the stator are driven to reciprocally move in mutually opposite directions. A 180 degree phase synchronizing mechanism is used to synchronize phases of the rotor and the stator. The mechanism is fixed to a housing and connected to the rotor and the stator. By this configuration, the amount of power transmission loss is reduced to a minimum, which improves energy conversion efficiency.

11 Claims, 7 Drawing Sheets

LINEAR SHUTTLE MOTOR ASSEMBLY AND A CONTROLLER THEREFOR

BACKGROUND OF THE INVENTION

1. Field of the Invention

The present invention relates to a linear shuttle motor assembly and a controller for controlling the same, wherein the linear shuttle motor is used for linearly moving a load, such as a print head, at a high speed back and forth between two extremes.

2. Description of the Related Art

Heretofore, some printers employ linear motor assemblies which include a stator made up of permanent magnets, and a rotor made up of coils. The stator is fixedly mounted on a printer housing. The rotor is driven in accordance with the principal of Fleming's left-hand rule. A print head is connected to the rotor so as to move reciprocally with reciprical movement of the rotor. In order to suppress generation of moment in the stationary components but obtain couple, a counter balance is connected to the rotor through a vector force conversion mechanism. The drive force of the rotor is transmitted through the vector force conversion mechanism to the counter balance, to recriprically move the rotor and the counter balance in opposite directions in order to maintain a fixed center of gravity for the overall system.

The conventional linear shuttle motor assembly requires a great deal of thrust, because so much thrust is consumed to move the rotor, the print head, and the counter balance and because so much thrust is wasted as transmission loss in the vector force conversion mechanism. In particular, inertial force must be overcome each time the print head reverses movement direction during its reciprical transport. In order to generate repulsion thrust that overcomes the inertial force, it was required that a reverse drive be operated with a large current, say about 20 Amperes, with a D.C. power source generating 40 volts.

A further disadvantage exists in that the transmission loss at the vector force conversion mechanism increases instantaneously each time the head transport direction is reversed. This high transmission loss causes wearing down of the vector force conversion mechanism by abrasion. In order to relieve such disadvantages, it has been proposed to use repulsion springs or repulsion magnets to weaken inertial force generated at the time when the rotor reverses its direction and to supplement repulsion thrust.

SUMMARY OF THE INVENTION

It is an objective of the present invention to provide a linear shuttle motor assembly that reduces power transmission loss and driving energy required when the print head reverses direction, so that energy conversion efficiency is improved without the need for an urging means of some kind.

The above-described objectives can be achieved using the following configuration:

1. A motor is configured from a rotor and a stator having the same mass or weight. The rotor and the stator are supported to be reciprocally movable along the same axis and between two extremes, and are driven to reciprocally move in mutually opposite directions while maintaining a positional relationship such that a distance from one extreme to the center of rotor is equal to a distance from the other extreme to the center of stator. A 180 degree phase synchronizing mechanism is used to synchronize phases of the rotor and the stator. The 180 degree phase synchronizing mechanism is fixed to the housing of the linear shuttle motor assembly, and connected to the rotor and the stator.

2. The rotor includes permanent magnets that are juxtaposed in a line, which defines the axis of the rotor. Ferromagnetic material is disposed between adjacent magnets. The magnets are oriented with the same poles in confrontation. With this configuration, magnetic lines of force are concentrated and extend in a direction perpendicular to the axis of the rotor.

3. The stator includes a pair of permanent magnets, one magnet being attached to each end of the stator. The magnets of the stator and the rotor are oriented with the same poles, that is, repelling poles, facing each other. That is, either the N pole of the stator magnet faces the N pole of the end rotor magnet, or the S pole of the stator magnet faces the S pole of the end rotor magnet. Also, four solenoids, that is, a fixed-speed solenoid, a reversing solenoid, a left-end solenoid, and a right-end solenoid, are attached around the periphery of the stator, at positions as shown in FIGS. 2(a) to 2(h).

4. A variety of components are provided for driving the linear shuttle motor assembly. That is, a fixed-speed solenoid drive, a reversing solenoid drive, left- and right-end solenoid drives, a stop controller, a start controller, a fixed-speed controller, and a reversal controller are provided for driving the linear shuttle motor assembly.

5. An auxiliary magnetic circuit can be provided around the exterior periphery of the solenoids to increase the density of magnetic flux that are out by the solenoids.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

A printer with a linear shuttle motor assembly according to the embodiment of the present invention will be described while referring to the accompanying drawings.

Figure 1:
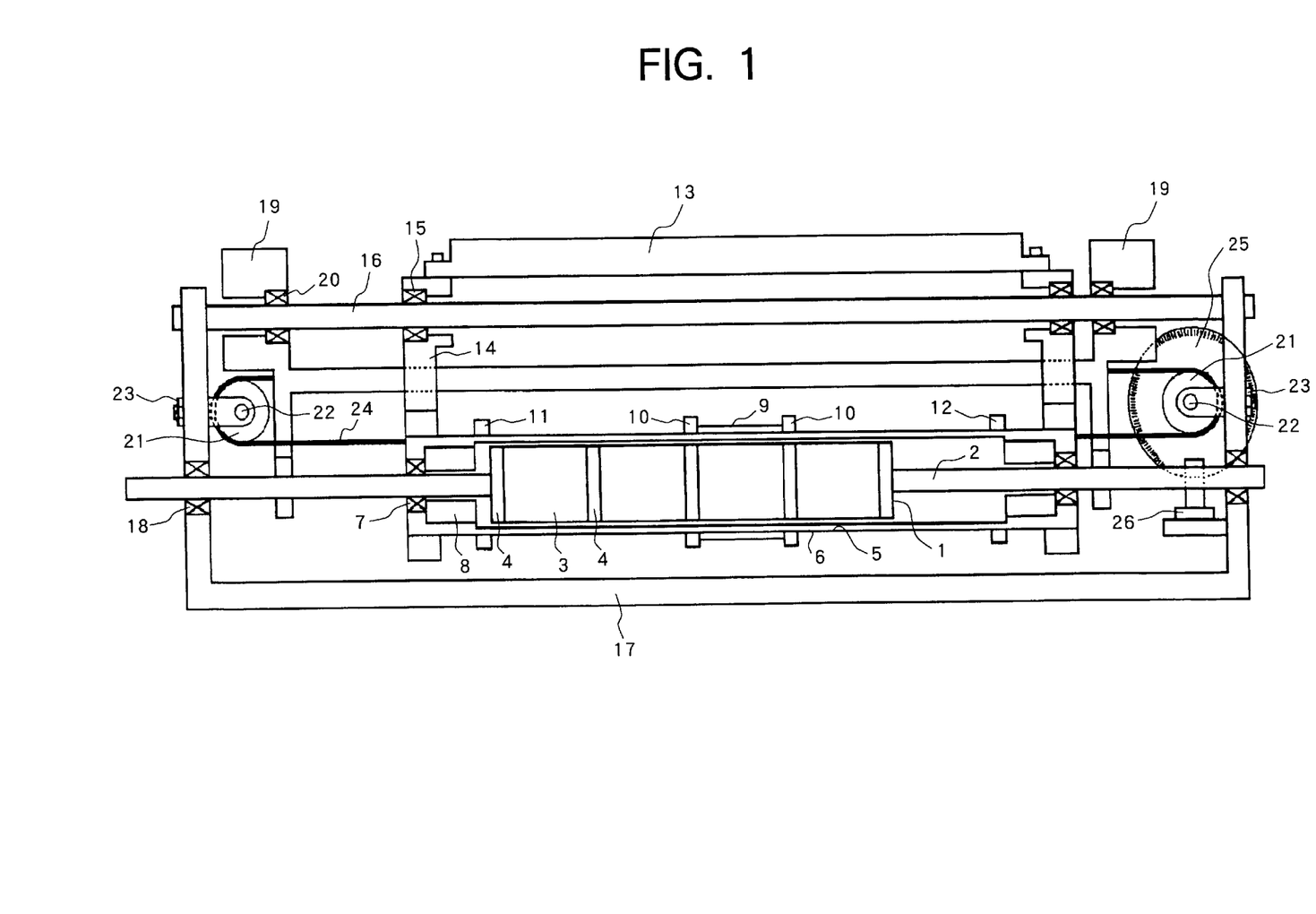
FIG. 1 is a cross-sectional view showing a linear shuttle motor assembly according to an embodiment of the present invention.

As shown in FIG. 1, a linear shuttle motor assembly according to the embodiment includes a rotor 1, a stator 5, a counter balance 19, and a head 13, all connected to reciprocally move in a linked manner. That is, the rotor 1 is connected to the counter balance 19 by a rotor shaft 2. The stator 5 is connected to the head 13 by arms 14. The stator 5 and the counter balance 19 are connected by a belt 24 and pulleys 21. As will be described in further detail below, with this configuration the rotor 1 and stator 5 move reciprocally in synchronization so that the sum of displacements of the rotor 1 and the stator 5 is zeroed.

The rotor shaft 2 is supported on a shuttle housing 17 by bearings 18. The rotor 1 is fixed near the center of the rotor shaft 2 and the counter balance 19 is attached at two points, that is, left and right ends, of the rotor shaft 2.

The rotor 1 includes four cylindrical magnets 3 and ferromagnetic material 4. The magnets 3 are centered on the rotor shaft 2 with the same poles facing each other, so that repulsion force is generated between adjacent magnets 3. The ferromagnetic material 4 is disposed between adjacent magnets 3 and also at both ends of the rotor 1. The ferromagnetic material 4 disposed between adjacent magnets 3 concentrates strong lines of magnetic force around its periphery. The lines of magnetic force extend in a direction perpendicular to the axis of the rotor shaft 2. The ferromagnetic material 4 disposed at both ends of the rotor 1 creates lines of magnetic force that are parallel with the rotor shaft 2, and also serves as fixing nuts that sandwich the magnets 3 therebetween.

The stator 5 includes a stator housing 6, bearings 7 and a pair of cylindrical magnets 8. The rotor 1 and the stator 5 are designed to have the same mass. The stator housing 6 serves as the base of the stator 5 and is formed in a cylindrical shape from a non-magnetic material. The bearings 7 are disposed on either ends of the stator housing 6. The magnets 8 are disposed in the stator housing 6 to the interior of the bearings 7. The magnets 8 are oriented so that the poles of the magnets 8 repel the ends of the rotor 1. That is, each magnet 8 is oriented with the pole that faces an end of the rotor 1 being the same as the pole of the lines of magnetic force from that end of the rotor 1.

A fixed-speed solenoid 9, a reversal solenoid 10, a left-end solenoid 11, and a right-end solenoid 12 are fixed at predetermined positions around the periphery of the stator 5. As will be described later, these solenoids 9 to 12, the magnets 3, and the ferromagnetic material 4 serve as a repulsion magnet circuit.

In this embodiment, the print head 13 is the load of the linear shuttle motor assembly. The print head 13 is mounted on a shaft 16, which is fixed to the shuttle housing 17. Bearings 15 are provided at both ends of the print head 13 to enable the print head 13 to slide leftward and rightward along the shaft 16. The arms 14, which connect the print head 13 to the stator 5, extend from either end of the stator 5.

The counter balance 19 is shaped substantially like the capital letter "H" as viewed in FIG. 1. The counter balance 19 is slidably movably mounted on the shaft 16 through bearings 20, and so is capable of leftward and rightward reciprocal movement along the shaft 16. It should be noted that it is preferable to form the counter balance 19 to have the same mass as the combination of the print head 13 and the arms 14.

The pulleys 21 are attached to left and right ends of the shuttle housing 17 by pulley holders 22 and nuts 23. The belt 24 is looped through the pulleys 21. Both ends of the stator 5 and both ends of the counter balance 19 are connected to the belt 24. With this configuration, the stator 5 and the counter balance 19 are connected to each other through the pulleys 21 and the belt 24. The pulleys 21, the pulley holders 22, the nuts 23, and the belt 24 serve as a 180 degree phase synchronization mechanism. Because the stator 5 and the counter balance 19 are connected to the 180 degree phase synchronization mechanism, the stator 5 and the print head 13 movable linearly and reciprocally in the opposite direction from the rotor 1 and the counter balance 19.

An encoder 25 is attached on an extension of the rotational shaft of the right-hand pulley 21. The encoder 25 is provided with a relatively large diameter, so that movement at the outer periphery of the encoder 25 is greater than movement of the counter balance 19 or the stator 5. An optical sensor 26 is attached on the shuttle housing 17. The combination of the encoder 25 and the optical sensor 26 enable accurate detection of leftward and rightward displacement of the print head 13.

FIGS. 2(a) through 2(h) are schematic views for describing operation principles of the linear shuttle motor assembly of the embodiment, under the control of a magnetic repulsion circuit according to the present invention. FIGS. 2(a) through 2(h) indicate changes that occur when the rotor 1 moves rightward, reverses direction, and moves leftward as viewed in the drawings. In particular, FIGS. 2(a) through 2(h) show changes in magnetic polarity, in direction of magnetic lines of force, in magnetizing current of the solenoids, in thrust FR that operates on the rotor 1, and in thrust FS that operates on the stator 5 in accordance with the principle of Fleming's left-hand rule, as these change occur during a single reciprocal operation, that is, from when the rotor 1 and the stator 5 are at rest, to when they start moving, to when they reverse direction of movement, until they return to their initial positions at rest.

Figure 2:
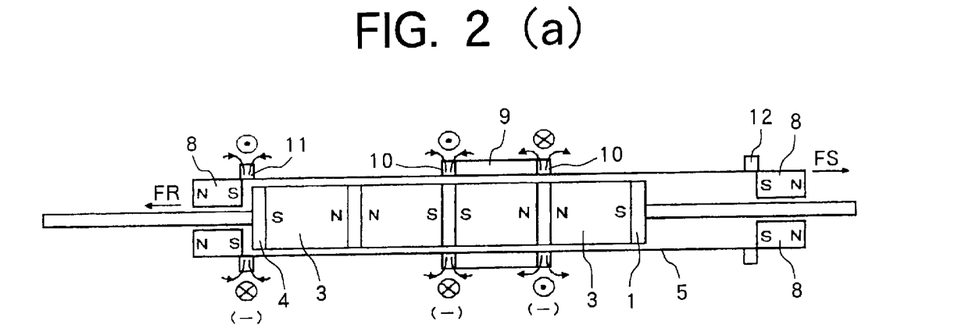
FIGS. 2(a) to 2(h) are schematic views for describing operation principles of the linear shuttle motor assembly of the embodiment.
Figure 3:
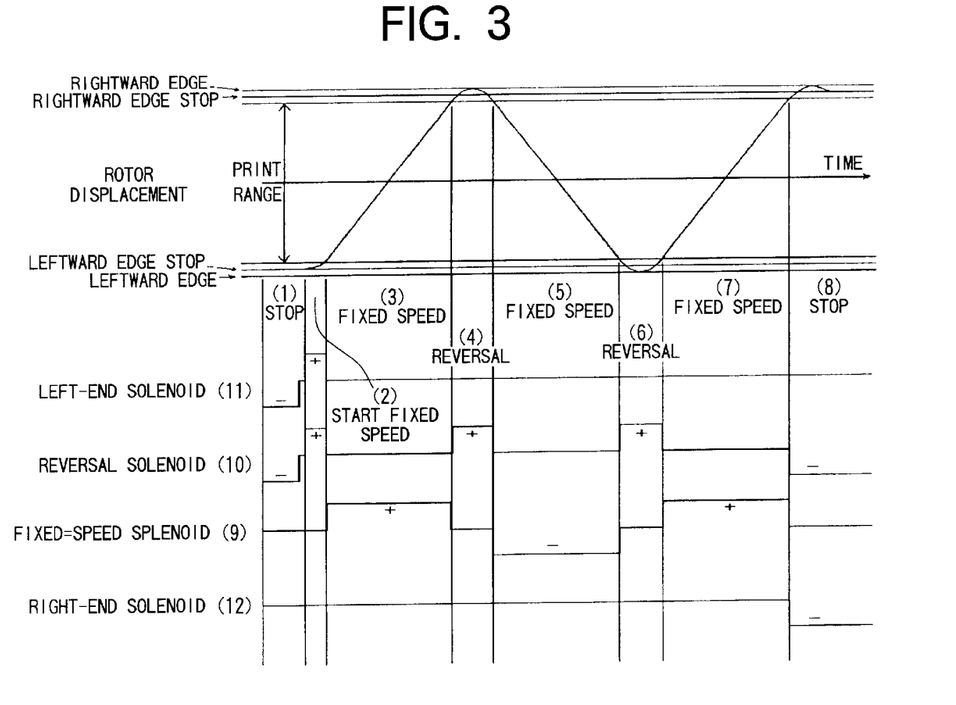
FIG. 3 is a timing chart showing the relationship between various drive signals and position of the rotor.

FIG. 3 is a time chart showing operation of the linear shuttle motor assembly according to the embodiment of the present invention. In FIG. 3, displacement of the rotor 1 and magnetization timing of each solenoid will be explained in connection with changes shown in FIGS. 2(a) to 2(h).

When the rotor 1 and the stator 5 are in a stationary condition as indicated in FIG. 2(a), the rotor 1 is positioned at the left edge and the stator 5 is positioned at the "RIGHTWARD EDGE" indicated in FIG. 3. While the printer is waiting for a host computer (not shown) to transfer data, that is, while the printer is waiting to start printing, the reversal solenoid 10 and the left-end solenoid 11 are negatively magnetized to impart a rightward force FS on the stator 5 and a leftward force FR on the rotor 1. The forces FR and FS are equivalent to each other, and urge the rotor 1 and stator 5 to move in opposite directions so that the rotor 1 is stopped at its left-hand stop position, which is where the repulsion force generated between the left-hand ferromagnetic material 4 and the left-hand magnet 8 is at equilibrium with the force FS.

When the printer receives data from the host computer while the rotor 1 is in its stationary condition, then the printer prepares to start printing. At this time, the printer changes magnetic polarity and the like from the stationary conditions shown in FIG. 2(a) to start conditions shown in FIG. 2(b). That is, the left-end solenoid 11 and the reversal solenoid 10 are positively magnetized to impart a leftward force FS on the stator 5 that accelerates the stator 5 leftward. Because the rotor 1 and the stator 5 are linked together, the rotor 1 starts moving rightward at the same instant that the stator 5 starts moving leftward. The rotor 1 starts moving from the leftward edge stopped position to the leftmost edge of the range where printing is performed, in what is referred to as the entrance displacement. That is, the printer starts actual printing operations after the entrance displacement.

The print head 13 must move linearly at a fixed speed once printing operations are started. To achieve this, the printer switches magnetic polarity and the like to the fixed speed conditions indicated in FIG. 2(c) after the entrance displacement. That is, because the rotor 1 and the stator 5 are already moving by inertia, the fixed-speed solenoid 9 need only be positively magnetized by application of a current sufficient enough to induce a force FS that prevents the stator 5 from slowing down.

When a print cycle is completed, then the linear shuttle motor assembly enters the first half of the reversal condition shown in FIG. 2(d). At this point, inertial force moves the rotor 1 rightward and the stator 5 leftward. When the stator 5 is pressed against the rotor 1 by inertial force, the magnets 3 of the rotor 1 and the magnets 8 of the stator 5 repel each other through the ferromagnetic material 4, because the S pole of the right-end magnet 3 faces the S pole of the right-end magnet 8. Once this repulsion force exceeds the inertial force generated during the fixed speed condition of FIG. 2(c), then the rotor 1 and the stator 5 will reverse direction of movement at a reversal position indicated as the "RIGHTWARD EDGE" in FIG. 3. As a result, the rotor 1 starts moving leftward and the stator 5 starts moving rightward. It should be noted that the reversal solenoid 10 is positively magnetized at the same timing as when the rotor 1 and the stator 5 reverse directions. This imparts a force FS on the stator 5 that moves the stator 5 rightward, and further reduces the time required for reversing directions, thereby improving printing speed.

Next, the printer changes magnetic polarity and the like to the fixed speed conditions shown in FIG. 2(c), whereupon another printing cycle is performed, this time with the rotor 1 moving toward the leftward edge. At this time, the fixed-speed solenoid 9 is negatively magnetized. Because the rotor 1 and the stator 5 are already moving by inertia, the fixed-speed solenoid 9 need only be positively magnetized by application of a current sufficient enough to induce a force FS that prevents the stator 5 from slowing down.

FIG. 2(f) indicates the rotor 1 at the leftward-edge reversal position, that is, at the opposite reversal edge as that indicated in FIG. 2(d). At this point, inertia presses the rotor 1 leftward and the stator 5 rightward. As the left-end magnets 3 of the rotor 1 and the left-end magnets 8 of the stator 5 approach each other, the repulsion force between the magnets 3, 8 will increase until it exceeds the inertial force of the fixed speed condition of FIG. 2(e). Then the rotor 1 and the stator 5 will reverse direction of movement, so that the rotor 1 starts moving rightward and the stator 5 starts moving leftward. It should be noted that the reversal solenoid 10 is positively magnetized at the time that the rotor 1 and the stator 5 reverse direction. This imparts a force to the stator 5 that moves the stator 5 leftward, which further reduces the time required for reversal, thereby improving printing speed. The reversal position is indicated as "LEFTWARD EDGE" in FIG. 3.

FIG. 2(g) shows the same fixed speed operations as shown in FIG. 2(c).

When printing has been completed for all data from the host computer, then the rotor 1 and the stator 5 move to the stopped condition shown in FIG. 2(h). The rotor 1 first moves to the right-hand position by inertia. Then, the reversal solenoid 10 and the right-end solenoid 12 are negatively magnetized, to apply the stator 5 with a force to move the stator 5 leftward. This applies a corresponding force to the rotor 1, but which moves the rotor 1 in the opposite direction. The final stopping position of the rotor 1 and the stator 5 is the position where this force and the repulsive force between the magnets 3 at the edge of the rotor 1 and the magnets 8 reach equilibrium.

Figure 4:
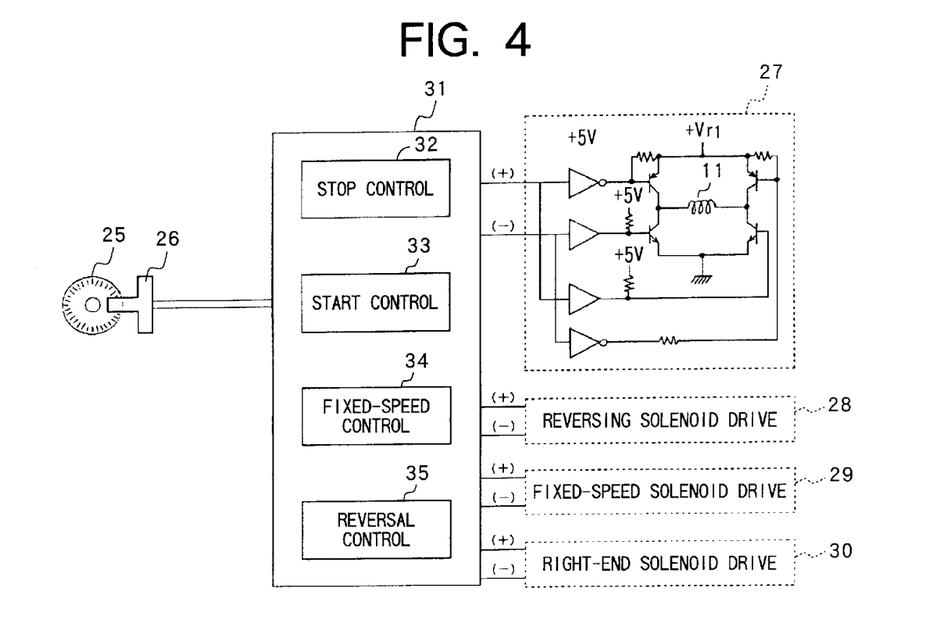
FIG. 4 is a block diagram representing control circuitry of the linear shuttle motor assembly of the embodiment.
Figure 5:
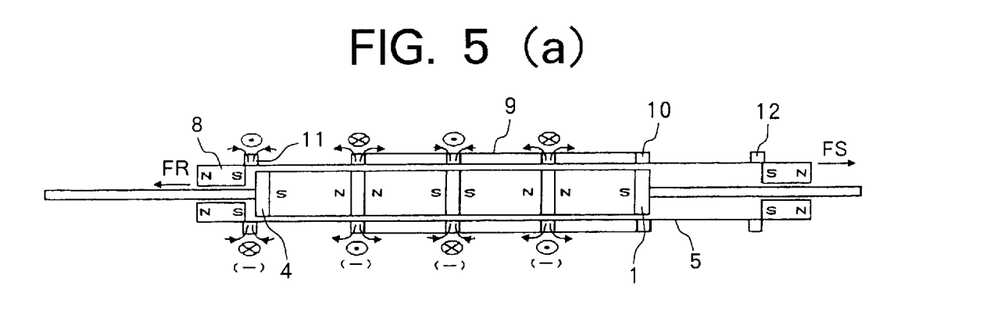
FIGS. 5(a) to 5(d) are schematic views for describing operation principles of linear shuttle motor assembly according to a modification of the embodiment.
Figure 6:
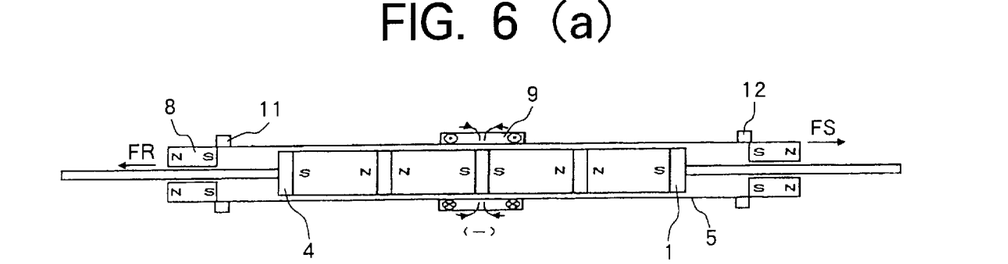
FIGS. 6(a) to 6(d) are schematic views for describing operation principles of linear shuttle motor assembly according to another modification of the embodiment.
Figure 7:
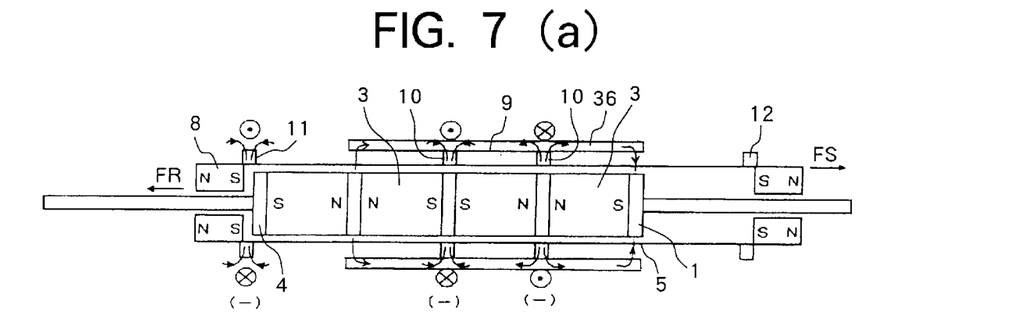
FIGS. 7(a) to 7(d) are schematic views for describing operation principles of linear shuttle motor assembly according to another modification of the embodiment.

FIG. 5 shows a linear shuttle motor assembly controller for performing the above-described operations. The controller includes a shuttle motor control 31 connected to solenoid drives 27 to 30. The left-end solenoid drive 27 is configured from a full bridge circuit, capable of both positively and negatively energizing the left-end solenoid 11. Although not shown in the drawings, each of the reversing solenoid drive 28, the fixed-speed solenoid drive 29, and the right-end solenoid drive 30 are also configured from a full bridge circuit, capable of positively and negatively energizing the reversal solenoid 10, the fixed-speed solenoid 9, and the right-end solenoid 12, respectively.

The shuttle motor controller 31 is configured from a general-purpose microcomputer including a stop controller 32, a start controller 33, a fixed-speed controller 34, and a reversal controller 35. The shuttle motor controller 31 is connected to the optical sensor 26. As described above, the optical sensor 26 is disposed at the right-hand edge of the shuttle housing 17 as shown in FIG. 1. The optical sensor 26 outputs a signal according to rotation of the encoder 25, which rotates in association with the pulley 21. The stop controller 32, the start controller 33, the fixed-speed controller 34, and the reversal controller 35 generate signals as shown in FIG. 3, based on the signal from the encoder 25.

It should be noted that the same circuitry can be shared to perform both the functions of the left-end solenoid drive 27 and the right-end solenoid drive 30. In this case, the shared circuitry can be controlled by the stop controller 32.

FIGS. 5(a) to 5(d) show a modification of the embodiment shown in FIG. 1. As shown, operations are similar to those shown in FIGS. 2(a) through 2(h). In this modification, the number of drive solenoids has been increased, that is, one more reversal solenoid 10 and one more fixed-speed solenoid have been added. The configuration of FIGS. 5(a) to 5(d) produces ⅓ the stopping power, ⅓ the starting thrust, three times the fixed-speed thrust, and 3⁄2 the reversal thrust of the configuration shown in FIG. 1.

FIGS. 6(a) to 6(d) show a modification of the configuration shown in FIGS. 2(a) to 2(h). In this modification, the reversing solenoid is dispensed with. With this configuration, the left-end solenoid 11 and the right-end solenoid 12 can be used instead of the reversing solenoid when stopping control is not needed, such as applications when printing is consecutively performed.

FIGS. 7(a) to 7(e) show a modification of the configuration shown in FIG. 2. In this modification, an electric iron plate 36 is further included. The electric iron plate 36 is disposed around the fixed-speed solenoid 9 and the reversal solenoid 10. The electric iron plate 36 serves as an auxiliary magnetic circuit with a low reluctance, so that the lines of magnetic force coming from the N pole of each of the magnets 3 pass through the electric iron plate 36 to reach the S pole. Because the number of lines of magnetic induction that is cut by the solenoids increases, a stronger linear propulsion and repulsion force can be obtained.

A series of linear shuttle motor assemblies, each have a different amplitude, can be easily produced by designing configuration using the following relational formulas:

$$\text{amplitude } A=(M+S)/4 \quad (1)$$

$$\text{rotor length } Lr=4M+5S \quad (2)$$

wherein M represents magnet length; and

S represents the thickness of the ferromagnetic material in the direction in which layers are stacked.

$$\text{internal length } L_s \text{ of the stator} = 5M + 6S + 2G \quad (3)$$

wherein G represents the gas, that is, distance, between the rotor and the stator at the time that the rotor and the stator are reversing direction, which is the time when they are closest to each other.

For example, a linear shuttle motor assembly with an amplitude A can be designed using these formulas by merely setting the magnet length M and the thickness S of the ferromagnetic material in the layer direction to values appropriate for filling requirements of formula (1). Once the values of the magnet length M and the thickness S are set, then the rotor length Lr can be determined using the formula (2). Alternatively, the internal length Ls of the stator can be determined using the values for the length Mm the thickness S, and the gap G.

The following effects can be obtained with the configurations of the embodiment and its modifications described above.

1. The amount of power transmission loss is reduced to a minimum, which improves energy conversion efficiency, because both the rotor and the stator are transported by oppositely directed forces that are based on the principal of Fleming's left-hand rule drive movement.
2. The energy conversion efficiency is improved because a repulsion magnetic circuit that uses magnetic energy with high efficiency is provided in the linear shuttle motor itself for obtaining thrust and reversal thrust.
3. Generation of moment in the stationary components can be theoretically suppressed to zero, so that vibration in the linear shuttle motor assembly can be suppressed to a minimum, because the rotor, the stator, the load (e.g., the print head), and the counter balance move reciprocally relative to each other on the same axis, so as to maintain a fixed center of gravity for the overall system. In concrete terms, the rotor and the counter balance move in the same direction as a single unit. The stator and the print head also move in the same direction as another single unit. The rotor/counter balance unit and the stator/print head unit always move by the same distance in opposite directions.
4. The production cost of mechanical and electrical components can be minimized, because energy conversion is performed with a high efficiency.
5. Heat radiation from and air cooling of the solenoids can be easily performed, because the solenoids are wound around the exterior of the stator.
6. The propulsion force can be easily increased by increasing the number of drive solenoids or the number of layers in the repulsion magnet of the rotor.
7. A series of linear shuttle motor assemblies, each with a different amplitude, can be easily designed.
8. Components will not be worn down as much as in conventional configurations, because the configuration of the present invention requires no vector conversion mechanism.
9. The rotor and the stator can be driven in a broad range of speeds, because the repulsion force of magnets is used to reverse direction of the rotor and the stator. That is, the inertial force to be overcome when the rotor and the stator switch direction of movement varies greatly with the speed of linear movement. However, the repulsion force generated between the magnet at the end of the rotor and the magnet of the stator increases greatly as the distance between the magnets decreases. Therefore, small or large inertial force can be properly overcome by setting the reversal position with the rotor and stator closer together when inertial force is large and farther apart when inertial force is small.
10. Movement of the counter balance and the stator can be accurately determined with an inexpensive configuration, because the encoder of the 180 degree phase synchronization mechanism can be enlarged to a diameter that magnifies linear movement of the counter balance and the stator.

While the invention has been described in detail with reference to specific embodiments thereof, it would be apparent to those skilled in the art that various changes and modifications may be made therein without departing from the spirit of the invention, the scope of which is defined by the attached claims.

What is claimed is:

1. A linear shuttle motor assembly comprising:
    a shuttle housing;
    a rotor reciprocally movably supported by said shuttle housing, said rotor including a rotor shaft and a plurality of permanent magnets juxtaposed in a direction in which said rotor shaft extends, said plurality of permanent magnets forming an outer surface and generating a number of lines of magnetic force in a direction perpendicular to the outer surface;
    a stator reciprocally movably supported by said shuttle housing, said stator including a stator housing, a reversal solenoid mounted on said stator housing for reversing a direction in which said stator moves, and a fixed-speed solenoid mounted on said stator housing for moving said stator at a fixed speed; and
    180 degree phase synchronizing mechanism connected to said rotor and said stator, for synchronizing reciprocal movements of said rotor and said stator in such a manner that a sum of displacements of said rotor and said stator is zeroed.

2. The linear shuttle motor assembly according to claim 1, further comprising a load connected to selective one of said rotor and said stator, and a counter balance connected to remaining one of said rotor and said stator, said counter balance having a mass determined depending upon a mass of said load.

3. The linear shuttle motor assembly according to claim 2, wherein said rotor and said stator have substantially the same mass and said load and said counter balance have substantially the same mass.

4. The linear shuttle motor assembly according to claim 1, wherein said stator housing is disposed in parallel with the outer surface of said plurality of permanent magnets.

5. The linear shuttle motor assembly according to claim 2, wherein said rotor further includes a right-end ferromagnetic member disposed at right end of said plurality of permanent magnets and a left-end ferromagnetic member disposed at left end of said plurality of permanent magnets, said right-end ferromagnetic member and said left-end ferromagnetic member being made from a ferromagnetic material and creating lines of magnetic force that are parallel with said rotor shaft, and wherein said stator further includes a right-end permanent magnet disposed to confront said right-end ferromagnetic member and creating lines of magnetic force against the lines of magnetic force created by said right-end ferromagnetic member so that repulsion force is generated when said right-end ferromagnetic member and said right-end permanent magnet move toward each other, a left-end permanent magnet disposed to confront said left-end ferromagnetic member and creating lines of magnetic force against the lines of magnetic force created by said left-end ferromagnetic member so that repulsion force is generated when said left-end ferromagnetic member and said left-end permanent magnet move toward each other, a right-end solenoid mounted on said stator housing in the vicinity of said right-end permanent magnet, and a left-end solenoid mounted on said stator housing in the vicinity of said left-end permanent magnet.

6. The linear shuttle motor assembly according to claim 1, wherein said plurality of permanent magnets are arranged so that the same poles face each other.

7. The linear shuttle motor assembly according to claim 6, wherein said rotor further includes a ferromagnetic member made from a ferromagnetic material, said ferromagnetic member being disposed between adjacent permanent magnets of said plurality of permanent magnets, said ferromagnetic member concentrating magnetic flux from the adjacent permanent magnets sandwiching said ferromagnetic member.

8. The linear shuttle motor assembly according to claim 1, further comprising a first controller for energizing said reversal solenoid, and a second controller for energizing said fixed-speed solenoid.

9. The linear shuttle motor assembly according to claim 5, further comprising a third controller for energizing said ring-end solenoid, and a fourth controller for energizing said left-end solenoid.

10. The linear shuttle motor assembly according to claim 1, further comprising an auxiliary magnetic circuit disposed around an exterior periphery of said reversal solenoid and said fixed-speed solenoid for increasing magnetic flux that are cut by said reversal solenoid and said fixed-speed solenoid.

11. The linear shuttle motor assembly according to claim 10, wherein said auxiliary magnetic circuit comprises an electric iron plate that allows the lines of magnetic force coming from each of said plurality of permanent magnets to pass through.

* * * * *